United States Patent
Haverinen

(10) Patent No.: US 8,903,312 B2
(45) Date of Patent: *Dec. 2, 2014

(54) MODIFIED CONNECTION ESTABLISHMENT FOR REDUCING POWER CONSUMPTION IN NEAR FIELD COMMUNICATION SYSTEMS

(71) Applicant: QUALCOMM Incorporated, San Diego, CA (US)

(72) Inventor: Anssi Kaleva Haverinen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/664,263

(22) Filed: Oct. 30, 2012

(65) Prior Publication Data

US 2013/0137370 A1    May 30, 2013

Related U.S. Application Data

(60) Provisional application No. 61/564,245, filed on Nov. 28, 2011.

(51) Int. Cl.
*H04B 5/00* (2006.01)

(52) U.S. Cl.
USPC ......................................................... 455/41.1

(58) Field of Classification Search
USPC ......................................................... 455/41.1
See application file for complete search history.

(56) References Cited

U.S. PATENT DOCUMENTS

| | | | |
|---|---|---|---|
| 7,346,061 B2 | 3/2008 | Takayama et al. | |
| 7,711,323 B2 | 5/2010 | Fujii | |
| 7,899,393 B2 | 3/2011 | Luong | |
| 7,925,215 B2 | 4/2011 | Takayama | |
| 8,264,991 B2 | 9/2012 | Arunan | |
| 2004/0203389 A1* | 10/2004 | Kojima et al. | 455/41.2 |
| 2005/0077356 A1* | 4/2005 | Takayama et al. | 235/451 |
| 2006/0198364 A1 | 9/2006 | Fujii | |
| 2008/0126560 A1* | 5/2008 | Takayama et al. | 709/233 |
| 2008/0291852 A1 | 11/2008 | Abel | |

(Continued)

FOREIGN PATENT DOCUMENTS

| | | |
|---|---|---|
| EP | 1798867 A2 | 6/2007 |
| EP | 2205028 A2 | 7/2010 |

(Continued)

OTHER PUBLICATIONS

International Search Report and Written Opinion—PCT/US2012/062761—ISA/EPO—Jan. 21, 2013.

(Continued)

*Primary Examiner* — Temesgh Ghebretinsae
*Assistant Examiner* — Devan Sandiford
(74) *Attorney, Agent, or Firm* — Mahamedi Paradice LLP

(57) ABSTRACT

A method and apparatus for reducing power consumption associated with establishing a connection in a near field communication system is disclosed. According to some embodiments, when requesting an active mode NFC connection, the initiator device can selectively extend transmission of its NFC carrier signal by an extended time period after transmitting a request frame to the target device. The extended time period, a value for which is embedded into the request frame, allows the target device additional time to stabilize its clock signal and transmit its own NFC carrier signal back to the initiator device. As a result, the initiator device may enable its NFC clock generator according to the value of the extended time period.

18 Claims, 6 Drawing Sheets

(56) References Cited

U.S. PATENT DOCUMENTS

| | | |
|---|---|---|
| 2010/0079261 A1 | 4/2010 | Goto et al. |
| 2010/0130127 A1* | 5/2010 | Takayama .................... 455/41.1 |
| 2011/0044396 A1* | 2/2011 | Fujii ............................. 375/268 |
| 2011/0076945 A1* | 3/2011 | Chang et al. ................. 455/41.2 |
| 2012/0019674 A1* | 1/2012 | Ohnishi et al. ............. 348/207.1 |
| 2012/0164944 A1* | 6/2012 | Yamaoka et al. ............ 455/41.1 |
| 2012/0178367 A1* | 7/2012 | Matsumoto et al. ......... 455/41.1 |
| 2012/0231735 A1* | 9/2012 | Takayama et al. ........... 455/41.1 |
| 2012/0302166 A1* | 11/2012 | Yamaoka et al. ............ 455/41.1 |
| 2013/0137371 A1* | 5/2013 | Haverinen ................... 455/41.1 |
| 2013/0143492 A1* | 6/2013 | Takayama et al. ........... 455/41.1 |
| 2014/0200051 A1* | 7/2014 | Liu ............................... 455/566 |

FOREIGN PATENT DOCUMENTS

| | | |
|---|---|---|
| JP | 2005210741 A | 8/2005 |
| JP | 2009-065514 A | 3/2009 |
| JP | 2010-130242 A | 6/2010 |
| WO | 2011058390 A1 | 5/2011 |

OTHER PUBLICATIONS

"Near Field Communication (NFC) IP-1; Interface and Protocol (NFCIP-1); ETSI TS 102 190", IEEE, LIS, Sophia Antipolis Cedex, France, vol. ECMATC32, No. V1.1.1, Mar. 1, 2003.

* cited by examiner

MODIFIED CONNECTION ESTABLISHMENT FOR REDUCING POWER CONSUMPTION IN NEAR FIELD COMMUNICATION SYSTEMS

CROSS-REFERENCE TO RELATED APPLICATIONS

This application claims the benefit under 35 USC 119(e) of the commonly owned U.S. Provisional Application No. 61/564,245 entitled "MODIFIED CONNECTION ESTABLISHMENT FOR REDUCING POWER CONSUMPTION IN NEAR FIELD COMMUNICATION SYSTEMS" filed on Nov. 28, 2011, the entirety of which is incorporated by reference herein.

TECHNICAL FIELD

The present embodiments relate generally to near-field communications (NFC), and specifically to reducing power consumption during NFC data exchanges.

BACKGROUND OF RELATED ART

NFC technology allows for simplified wireless data exchanges between two NFC-enabled devices over a range of several centimeters or less. For example, an NFC-enabled mobile phone or a smart card having an NFC/RFID tag may exchange data with an NFC reader (e.g., in a point-of-sale terminal or another mobile device), thereby allowing a customer to purchase goods or services without exchanging hard currency or physically swiping a credit card. NFC technology may also be used to facilitate social networking, contact sharing, and/or establishing other wireless connections (e.g., Bluetooth or WiFi).

To establish an NFC connection between an initiator device and a target device, both devices follow a number of NFC standards. Examples of such NFC standards include ISO/IEC 18092 and ECMA-340 standards, which define modulation schemes, encoding and decoding schemes, transfer rates, frame format, transmission protocols, and so forth, for an NFC connection. More specifically, to initiate an NFC connection with the target device, the initiator device transmits an un-modulated radio frequency (RF) carrier signal for an active RF guard time (currently set to approximately 5 ms), and then modulates the carrier signal to embed a polling command (e.g., request frame) that requests either an active communication mode or a passive communication mode. If the initiator device requests the active communication mode, the initiator device terminates transmission of its carrier signal after transmitting the polling command, and then the target device transmits data to the initiator device by generating and modulating its own RF carrier signal. Conversely, if the initiator device requests the passive communication mode, the initiator device continues transmitting its carrier signal, and the target device transmits data to the initiator device by load modulating the initiator device's carrier signal. Thus, for the active communication mode, power consumption is shared between the initiator device and the target device, while for the passive communication mode, the target device consumes very little (if any) power because it does not generate its own carrier signal.

More specifically, when the initiator device requests the active communication mode in its polling command, the target device is to generate and transmit its own carrier signal no later than a predetermined response time after the initiator device terminates its carrier signal transmission. Currently, the predetermined response time for active mode communications, which is sometimes referred to as the active delay time ($T_{ADT}$), is set at 302 µs by the ISO 18092 standards. As mentioned above, the initiator device typically terminates its carrier signal immediately after transmitting the polling command to the target device, for example, so that the initiator device can receive data transmitted from the target device via the target device's own carrier signal. Because many clock generators take much longer than 302 µs to generate and stabilize a clock signal suitable for generating and modulating an NFC carrier signal, the target device typically enables its clock generator immediately after detecting the initial un-modulated carrier signal transmitted from the initiator device and/or generates its own carrier signal only after determining that the initiator device has terminated its carrier signal. In this manner, the target device may have sufficient time to enable its clock generator, stabilize its clock signal, and transmit its own carrier signal within the active delay time ($T_{ADT}$). However, if the target device enables its clock generator prematurely or unnecessarily, power consumption may be unnecessarily consumed. For example, if the initiator device subsequently requests the passive communication mode (e.g., after transmitting its un-modulated carrier signal for the active RF guard time (5 ms)), then the target device does not need to generate and transmit its own carrier signal). This unnecessary power consumption is of particular concern when the target device is a mobile device having a limited power supply (e.g., a smartphone powered by a small battery.

Accordingly, there is a need to reduce power consumption associated with establishing an active mode NFC connection between NFC-enabled devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus are disclosed that reduce power consumption associated with establishing an active mode NFC connection between an NFC initiator device and an NFC target device. In accordance with the present embodiments, the initiator device may selectively extend the transmission of its carrier signal by an extended time period when requesting an active mode NFC connection with the target device, thereby allowing the target device additional time to enable its clock generator and/or stabilize the clock signal used to generate and transmit its own carrier signal. As a result, the target device may selectively enable its clock generator after receiving the request from the initiator device (e.g., rather than automatically enabling its clock generator upon detecting the initial un-modulated carrier signal transmission from the initiator device).

More specifically, for some embodiments, when the initiator device requests an active mode NFC connection, the initiator device selects a value indicating an extended time period and embeds the extended time period value into a request frame sent to the target device. For some embodiments, the extended time period may be referred to as an active RF extended time. The initiator device then extends transmission its carrier signal for the extended time period after sending the request frame to the target device (e.g., after modulating a request onto the carrier signal). The target device receives the request frame and retrieves the extended time period value embedded in the request frame. The target device may then use the retrieved extended time period value to determine when to enable its clock generator to generate its clock signal, and thereafter transmit its own carrier signal to the initiator device. By extending transmission of its carrier signal after sending the request frame (e.g., by the extended time period), the initiator device allows the target device sufficient time to stabilize its clock signal and to transmit its own carrier signal within the active mode response time (e.g., 302 μs). Conversely, if the request frame requests a passive mode NFC connection, the target device does not enable its clock generator and does not generate its own carrier signal, thereby reducing power consumption in the target device.

For some embodiments, the initiator device includes a look-up table to store one or more values for the extended time period. For at least one embodiment, the initiator device may select a suitable value for the extended time period in response to one or more operating conditions (e.g., interference conditions, an expected distance between the initiator device and the target device, and so on) and/or characteristics of the target device (e.g., type of clock generator, battery type, and so on).

The initiator device may transmit the value of the extended time period to the target in any suitable manner. For example, in at least some embodiments, the initiator device may embed the extended time period value into one or more reserved bits of the request frame sent to the target device.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

The present embodiments are discussed below in the context of establishing a near field communication (NFC) connection between two NFC-enabled devices. It is to be understood that the present embodiments are equally applicable to other wireless communication technologies and/or standards. In the following description, numerous specific details are set forth such as examples of specific components, circuits, software and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. The term "NFC" as used herein refers to various communications governed by various NFC protocols including, for example, ISO/IEC 18092, ECMA-340, and/or standards defined by the NFC Forum. The term "NFC clock generator" as used herein refers to a clock generator that generates a clock signal to be used for generating, transmitting, and/or modulating an NFC carrier signal for exchanging data during an NFC connection.

In addition, as used herein, the term "initiator device" refers to an NFC-enabled device that initiates an NFC connection (e.g., by transmitting a polling command or request to another NFC-enabled device), and the term "target device" refers to an NFC-enabled device that responds to a request from the initiator device (e.g., either by transmitting its own carrier signal in response to a request for an active mode NFC connection or by load modulating the initiator device's carrier signal in response to a request for a passive mode NFC connection).

Figure 1:
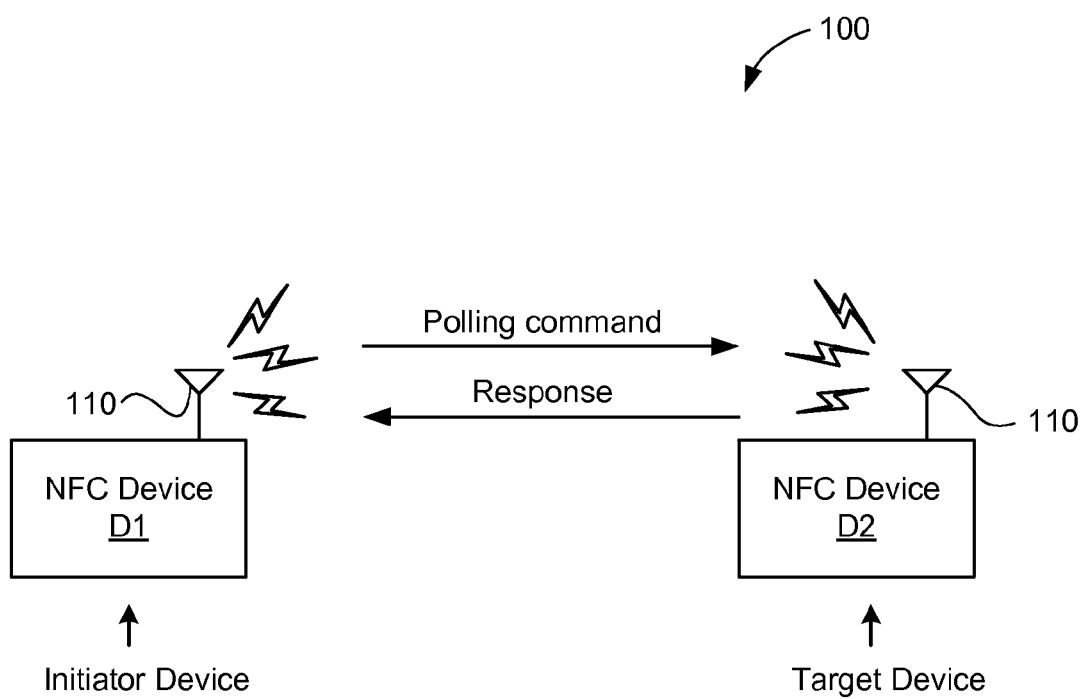
FIG. 1 is a block diagram of an NFC system that includes two NFC-enabled devices in accordance with some embodiments.

FIG. 1 shows an NFC system 100 that includes two NFC-enabled devices D1 and D2 in accordance with some embodiments. NFC devices D1 and D2 are each equipped with an NFC antenna 110 capable of exchanging wireless communication signals in the near field with other NFC antennas in other NFC devices. When the antennas 110 of the NFC devices D1 and D2 are brought near each other (e.g., within a few centimeters of each other), they become inductively coupled; once inductively coupled, they allow the NFC devices D1 and D2 to perform near-field communication with each other. In some embodiments, the antennas 110 are loop antennas that allow for radio frequency (RF) transmission and reception, although other well-known antennas can be used. For some embodiments, near-field communication between the NFC devices D1 and D2 is performed in accordance with one or more standards (e.g., ISO/IEC 18092, ECMA-340, and/or standards defined by the NFC Forum).

NFC devices D1 and D2 may be any suitable devices that can communicate with each other wirelessly according to NFC protocols or standards. For example, in some embodiments, both NFC devices D1 and D2 are mobile devices (e.g., cellular phones, personal digital assistants, or other mobile devices). In other embodiments, NFC device D1 is a mobile device and NFC device D2 is an NFC tag (e.g., a passive radio-frequency identification (RFID) tag). In still other embodiments, NFC device D1 is an NFC reader situated, for example, in a kiosk or admissions gate, and NFC device D2 is a mobile device or NFC tag. In some embodiments, NFC device D1 is a proximity coupling device (PCD) and NFC device D2 is a proximity integrated circuit card (PICC) (e.g., a contactless smart card).

For the exemplary embodiments described below, NFC device D1 is designated as the initiator device, and NFC device D2 is designated as the target device (as depicted in FIG. 1). For other embodiments, NFC device D1 may operate as the target device, and NFC device D2 may operate as the initiator device.

Figure 2:
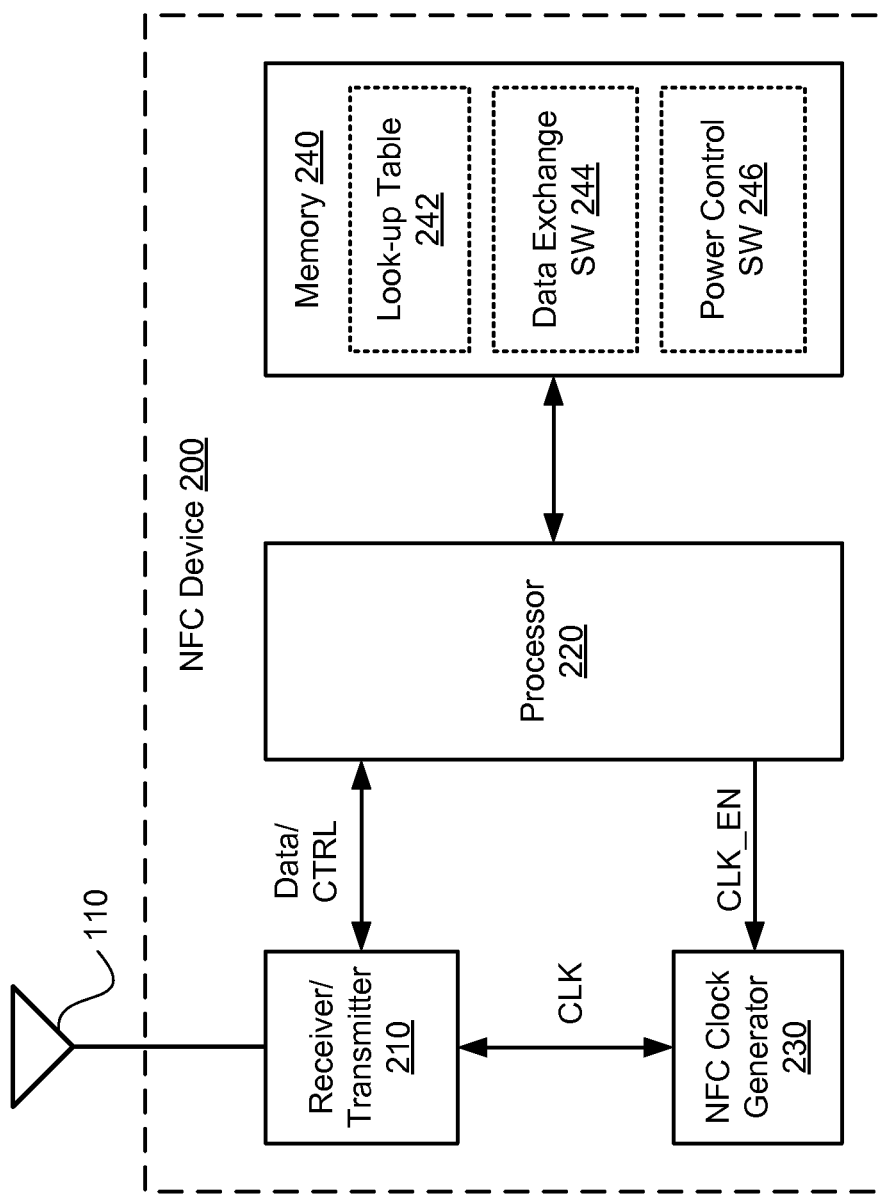
FIG. 2 is a block diagram of an NFC device in accordance with some embodiments.

FIG. 2 shows an NFC device 200 that is one embodiment of NFC device D1 and/or NFC device D2 of FIG. 1. NFC device 200 includes a well-known receiver/transmitter circuit 210, a processor 220, an NFC clock generator 230, and a memory 240. The receiver/transmitter circuit 210, which is coupled to antenna 110, to processor 220, and to NFC clock generator 230, may be used to transmit signals to and receive signals from another NFC-enabled device. More specifically, receiver/transmitter circuit 210 receives a clock signal CLK from NFC clock generator 230, and exchanges data and control signals (CTRL) with processor 220. In operation, receiver/transmitter circuit 210 may be used to generate and/or modulate data onto a carrier signal to be transmitted to another device via antenna 110, and may be used to receive and demodulate data from a carrier signal received by antenna 110. For some embodiments, receiver/transmitter circuit 210 may also be used to load modulate data onto a carrier signal transmitted from another device (e.g., when communicating in the NFC passive mode).

NFC clock generator 230 can be any suitable type of clock generator or clock circuit that generates a clock signal such as CLK suitable for use in generating an NFC carrier signal and/or modulating data onto the NFC carrier signal. For example, NFC clock generator 230 may be a voltage-controlled oscillator, a crystal oscillator, or a digital clock generator. Further, while the exemplary embodiment of FIG. 2 depicts NFC clock generator 230 as a dedicated or stand-alone clock generator for providing the clock signal CLK to receiver/transmitter 210, for other embodiments, clock generator 230 may be shared with other resources or modules on NFC device 200. Thus, for at least one embodiment, NFC clock generator 230 may be implemented within another circuit or module of NFC device 200.

Memory 240, which is coupled to processor 220, may be any suitable memory element or device. Memory 240 may include a look-up table 242 that stores one or more values for an extended time period ($T_{EXT}$) associated with continuing transmission of the initiator device's NFC carrier signal after a request frame has been modulated onto the carrier signal. For some embodiments, the extended time period $T_{EXT}$ may be predetermined and programmed into table 242 (e.g., by a manufacturer of the initiator device). For other embodiments, the table 242 may store a plurality of extended time periods $T_{EXT}$ that can be dynamically selected when transmitting a request frame (e.g., associated with a polling command) to the target device. For example, each of the plurality of extended time periods $T_{EXT}$ may be selected in response to one or more parameters including, for example, current operating conditions, predetermined environmental conditions, the type and/or operating characteristics of the target device's NFC clock generator or battery, and so on.

Figure 4A:
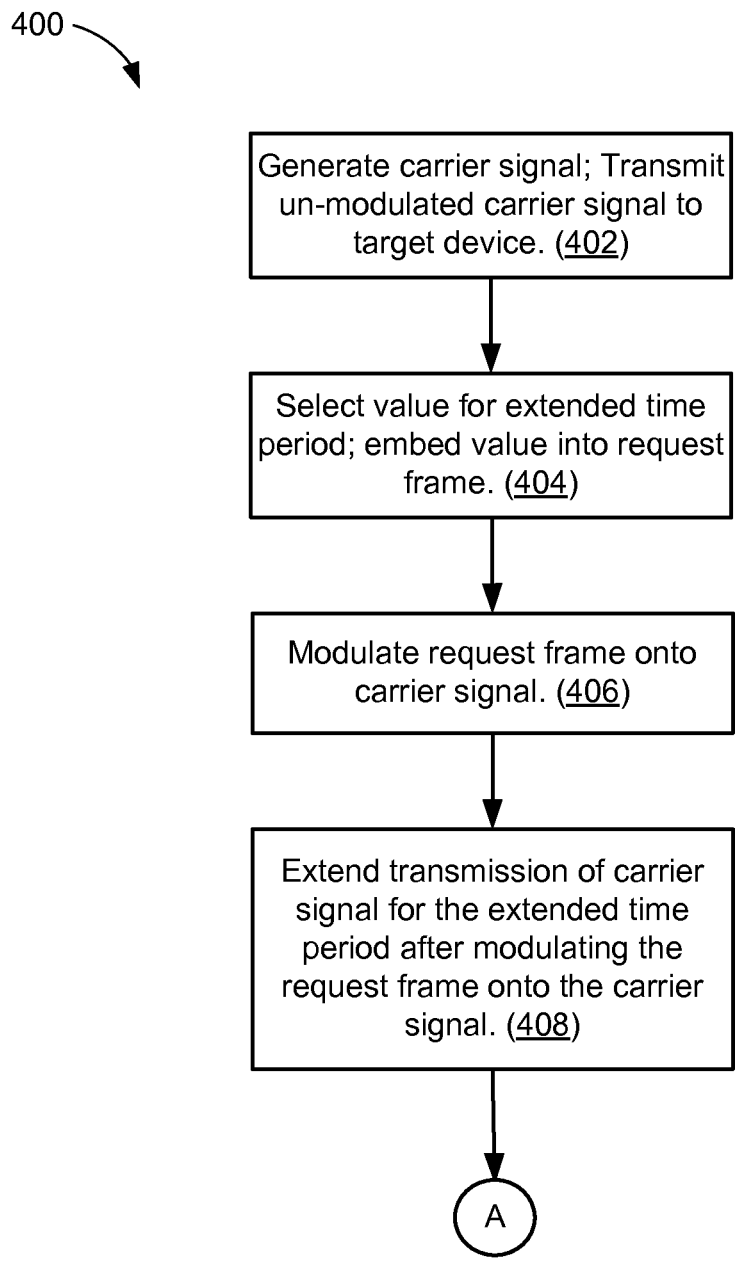
FIG. 4A is an illustrative flow chart depicting an exemplary operation for an NFC device operating as an initiator device in accordance with some embodiments.
Figure 4B:
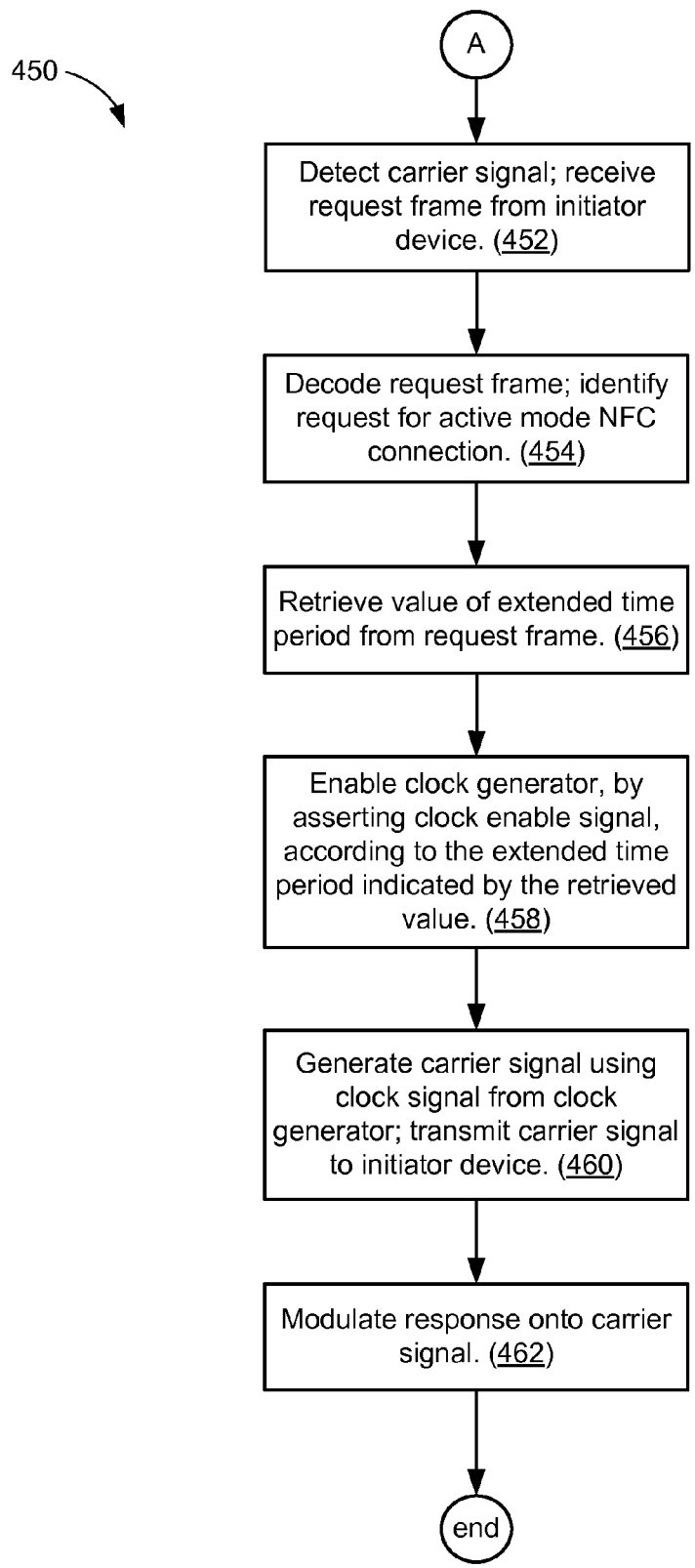
FIG. 4B is an illustrative flow chart depicting an exemplary operation for an NFC device operating as a target device in accordance with some embodiments.

Memory 240 may also include a non-transitory computer-readable medium (e.g., one or more nonvolatile memory elements, such as EPROM, EEPROM, Flash memory, a hard drive, and so on) that can store the following software modules:
  a data exchange software module 244 to facilitate the generation of an NFC carrier signal suitable for NFC data exchanges and/or to modulate data onto the NFC carrier signal (e.g., polling commands, requests, responses, and data to be exchanged with another NFC device) for example, as described for operations 402, 404, 406, and/or 408 of FIG. 4A and operations 452, 454, 456, 460, and/or 462 of FIG. 4B; and
  a power control software module 246 to determine power conditions and/or selectively enable and disable NFC clock generator 230 to reduce power consumption of NFC device 200, for example, as described for operation 458 of FIG. 4B.

The data exchange software module 244 includes instructions that, when executed by processor 220, can cause NFC device 200 to perform the corresponding functions. The power control software module 246 includes instructions that, when executed by processor 220, can cause NFC device 200 to perform the corresponding functions.

Processor 220, which is coupled to receiver/transmitter circuit 210, NFC clock generator 230, and memory 240, can be any suitable processor capable of executing scripts or instructions of one or more software programs stored in NFC device 200 (e.g., within memory 240). For example, processor 220 can execute data exchange software module 244 to facilitate the generation of the NFC carrier signal and/or to modulate data (e.g., a request frame containing an extended time period value) onto the NFC carrier signal. Processor 220 can also execute power control software module 246 to determine power conditions and/or selectively enable and disable NFC clock generator 230 to reduce power consumption of NFC device 200.

During the execution of one or more of the software modules stored in memory 240, processor 220 may send data and/or control signals to receiver/transmitter 210, may receive data and/or control signals from receiver/transmitter 210, and may provide a clock enable signal CLK_EN to NFC clock generator 230. More specifically, processor 220 may selectively assert CLK_EN to enable NFC clock generator 230 to generate and stabilize the clock signal CLK in response to determining that a polling command or request frame received from another NFC device is requesting an active communication mode, as described in more detail below. Processor 220 may also selectively de-assert CLK_EN to disable NFC clock generator 230 from generating the clock signal CLK when the other NFC device is requesting a passive communication mode (e.g., to reduce power consumption).

Although NFC device 200 may be used as either the initiator device D1 or the target device D2 in the present embodiments, it is noted that one or more elements of NFC device 200 may be omitted depending upon whether NFC device 200 is used as the initiator device D1 or the target device D2. For one example, when NFC device 200 is used as the initiator device D1 of FIG. 1, power control software module 246 may be omitted. For another example, when NFC device 200 is used as the target device D2 of FIG. 2, look-up table 242 may be omitted.

As mentioned above, when establishing an NFC connection or link between initiator device D1 and target device D2, the initiator device D1 may request either an active mode NFC connection or a passive mode NFC connection (e.g., by embedding the request into a polling command modulated onto the initiator device's carrier signal). In the active mode NFC connection, the initiator device D1 and the target device D2 each generate their own carrier signals and transmit data to other device by modulating data onto their own carrier signals (e.g., during alternating time period or slots). Conversely, in the passive mode NFC connection, only the initiator device D1 generates and transmits its own carrier signal; the target device D2 sends data (e.g., a response to the polling command) to the initiator device by load modulating the initiator device's carrier signal.

Thus, while power consumption may be shared between the initiator device D1 and target device D2 during active mode NFC connections, most (if not all) of the power consumption is attributed to the initiator device D1 during passive mode NFC connections. As a result, the passive mode NFC connection is suitable for use in environments where the target device D2 has a limited power supply (e.g., when a person uses an NFC-enabled smartphone to purchase goods at a store or restaurant). One of the reasons that the target device D2 consumes little (if any) power during the passive mode NFC connection is because the target device D2 does not have to enable and operate its own clock generator, and does not have to generate and transmit its own carrier signal.

According to current NFC standards, when the initiator device D1 requests the active mode NFC connection (e.g., as indicated in the polling command sent to the target device), the target device D2 is to begin transmission of its own carrier signal no later than 302 µs (e.g., the active delay time $T_{ADT}$) after the initiator device D1 terminates transmission of its own carrier signal. Thus, in a successful NFC connection, there can be no more than a 302 µs time delay between carrier signal transmissions from the initiator device D1 and the target device D2. However, as mentioned above, many clock generators (e.g., clock generator 230 of FIG. 2) take much longer than 302 µs to generate and stabilize the clock signal to be used for generating the NFC carrier signal. For example, clock generators implemented using voltage-controlled oscillators (VCOs) typically need three or more milliseconds after being enabled to stabilize the NFC carrier signal clock. Moreover, even more sophisticated clock generators such as crystal oscillators dedicated for generating NFC carrier signals may take as much as 1.5 milliseconds to stabilize the NFC carrier signal clock after being enabled.

As a result, a conventional NFC target device typically maintains its NFC clock generator in an enabled state in case it needs to generate and transmit its own carrier signal (e.g., for active mode NFC connections) within the 302 µs time period (e.g., as provided by the active delay time $T_{ADT}$). Although maintaining the target device's clock generator in an enabled state may result in unnecessary power consumption (e.g., if the initiator device requests the passive mode there is no need for the target device to generate or transmit its own carrier signal), failure to stabilize the target device's NFC carrier signal clock before expiration of the 302 µs time period may preclude establishing a successful NFC connection.

Thus, in accordance with the present embodiments, power consumption may be reduced in target device D2 by configuring target device D2 to enable its NFC clock generator 230 only in response to receiving a polling command or request frame that requests an active mode NFC connection. In this manner, target device D2 does not enable its NFC clock generator 230 or generate its own NFC carrier signal if initiator device D1 requests a passive mode NFC connection, thereby saving power consumption associated with enabling and operating its NFC clock generator 230 and/or transmitter portions of receiver/transmitter 210. In addition, by enabling its NFC clock generator 230 only after determining that initiator device D1 is requesting an active mode NFC connection, target device D2 does not prematurely enable its NFC clock generator 230, thereby further reducing power consumption in target device D2.

Further, to ensure that target device D2 is able to stabilize its NFC carrier signal clock and thereafter transmit its own NFC carrier signal within the 302 µs time period, the initiator device D1 may be configured to extend transmission of its carrier signal for an extended time period ($T_{EXT}$) after modulating the request frame onto its carrier signal. The extended time period $T_{EXT}$ may be any suitable value that allows target device D2 sufficient time to enable its NFC clock generator 230 in response to a request for an active mode NFC connection, to stabilize its NFC carrier signal clock, and to transmit its own NFC carrier signal to initiator device D1. For example, if initiator device D1 continues transmitting its NFC carrier signal for 7 ms after sending a request for an active mode NFC connection to target device D2, target device D2 may wait to enable its NFC clock generator 230 until after decoding the request and yet still be able to transmit its own NFC carrier signal back to the initiator device D1 within the 302 µs time period.

In addition, for some embodiments, target device D2 may enable its NFC clock generator 230 according to the extended time period value $T_{EXT}$ provided by initiator device D2. More specifically, in at least one embodiment, target device D2 may schedule enabling its NFC clock generator 230 in response to the value of $T_{EXT}$. For one example, if initiator device D1 indicates a value of 4 ms for $T_{EXT}$ and NFC clock generator 230 takes 3 ms to warm-up and stabilize its clock signal, then target device D2 may decide to enable its NFC clock generator 230 immediately after receiving the request frame. For another example, if initiator device D1 indicates a value of 8 ms for $T_{EXT}$ and NFC clock generator 230 takes 3 ms to warm-up and stabilize its clock signal, then target device D2 may decide to enable its NFC clock generator 230 several milliseconds after receiving the request frame (e.g., thereby reducing power consumption).

An exemplary operation for establishing an active mode NFC connection between initiator device D1 and target device D2 is described below with respect to the illustrative timing diagram 300 of FIG. 3. Timing diagram 300 depicts waveforms for initiator device D1's carrier signal clock CLK_D1, a first NFC carrier signal CS1 transmitted from initiator device D1, a second NFC carrier signal CS2 transmitted from target device D2, the clock enable signal CLK_EN in target device D2, and target device D2's carrier signal clock CLK_D2.

Figure 3A:
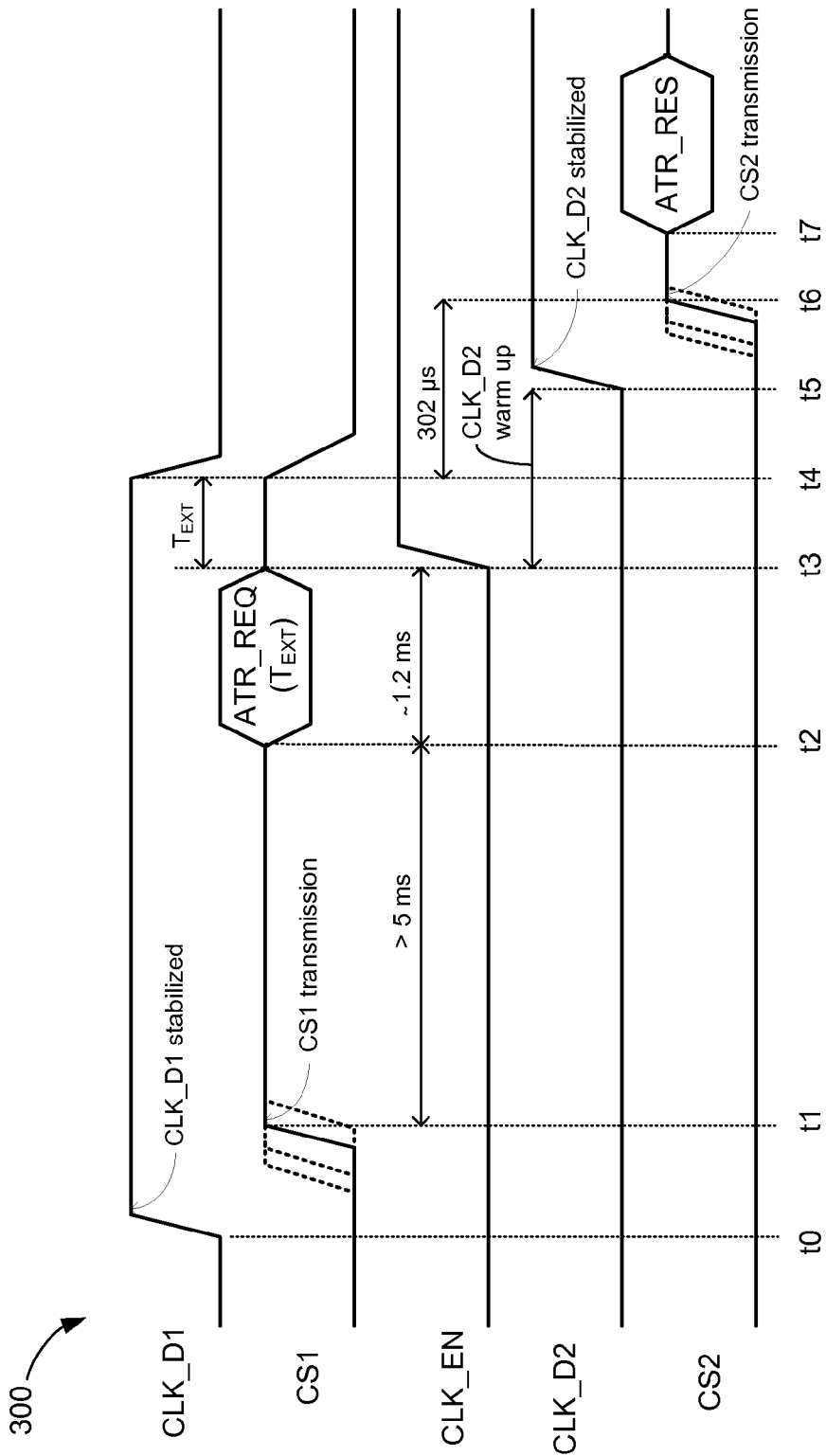
FIG. 3A is an exemplary timing diagram depicting NFC signal transmissions between an initiator device and a target device, in accordance with some embodiments.

First, initiator device D1 activates its NFC clock generator 230 at time t0. The initiator device D1's carrier signal clock CLK_D1 is stabilized by time t1, after which initiator device D1 transmits an un-modulated NFC carrier signal CS1 for 5 ms or more. At time t2, initiator device D1 modulates a polling command containing an attribute request frame (ATR_REQ) onto its NFC carrier signal CS1. In accordance with the present embodiments, initiator device D1 selects a value for an extended time period ($T_{EXT}$), and embeds the value of $T_{EXT}$ into the request frame sent to the target device (as depicted in FIG. 3A).

By time t3, the request frame has been transmitted to target device D2. In accordance with the present embodiments, after its polling command has been transmitted (e.g., after the last bit of the request frame ATR_REQ is modulated onto carrier signal CS1), initiator device D1 continues transmitting its NFC carrier signal CS1 for the extended time period ($T_{EXT}$) until time t4. In contrast, conventional initiator devices requesting an active mode NFC connection typically terminate transmission of their carrier signals immediately after transmitting the polling command or request frame (e.g., to reduce power consumption and/or to prepare for reception of the target device's NFC carrier signal).

At or before time t3, target device D2 receives the request frame (ATR_REQ) and determines that initiator device D1 is requesting an active mode NFC connection. In addition, target device D2 retrieves the extended time period value $T_{EXT}$ embedded in the request frame. In response thereto, target device D2 asserts (e.g., to logic high) its clock enable signal CLK_EN to enable its NFC clock generator 230 after a wait period determined according to the value of $T_{EXT}$. The target device D2's clock generator 230 warms up by time t5, and just after time t5 stabilizes its NFC carrier signal clock CLK_D2. Thus, after time t5, target device D2's clock signal CLK_D2 becomes available for use by its receiver/transmitter 210 to generate target device D2's NFC carrier signal CS2. Then, at or before time t6, target device D2 transmits its own NFC carrier signal CS2, and at time t7 target device D2 modulates an attribute response frame (ATR_RES) onto its NFC carrier signal CS2.

Note that initiator device D1 terminates its NFC carrier signal CS1 at time t4, which for the present embodiments triggers the beginning of the 302 μs time period during which target device D2 must transmit its own NFC carrier signal CS2 in response to initiator device D1's request frame. Because target device D2 asserted CLK_EN to enable its NFC clock generator 230 at time t3 (in response to decoding the request frame and determining the value of $T_{EXT}$), target device D2 is able to stabilize its NFC carrier signal clock CLK_D2 and transmit its own NFC carrier signal CS2 before the expiration of the 302 μs time period at time t6. Thus, for at least some embodiments, target device D2 uses the extended time period value $T_{EXT}$ to determine when to enable its NFC clock generator 230.

Figure 3B:
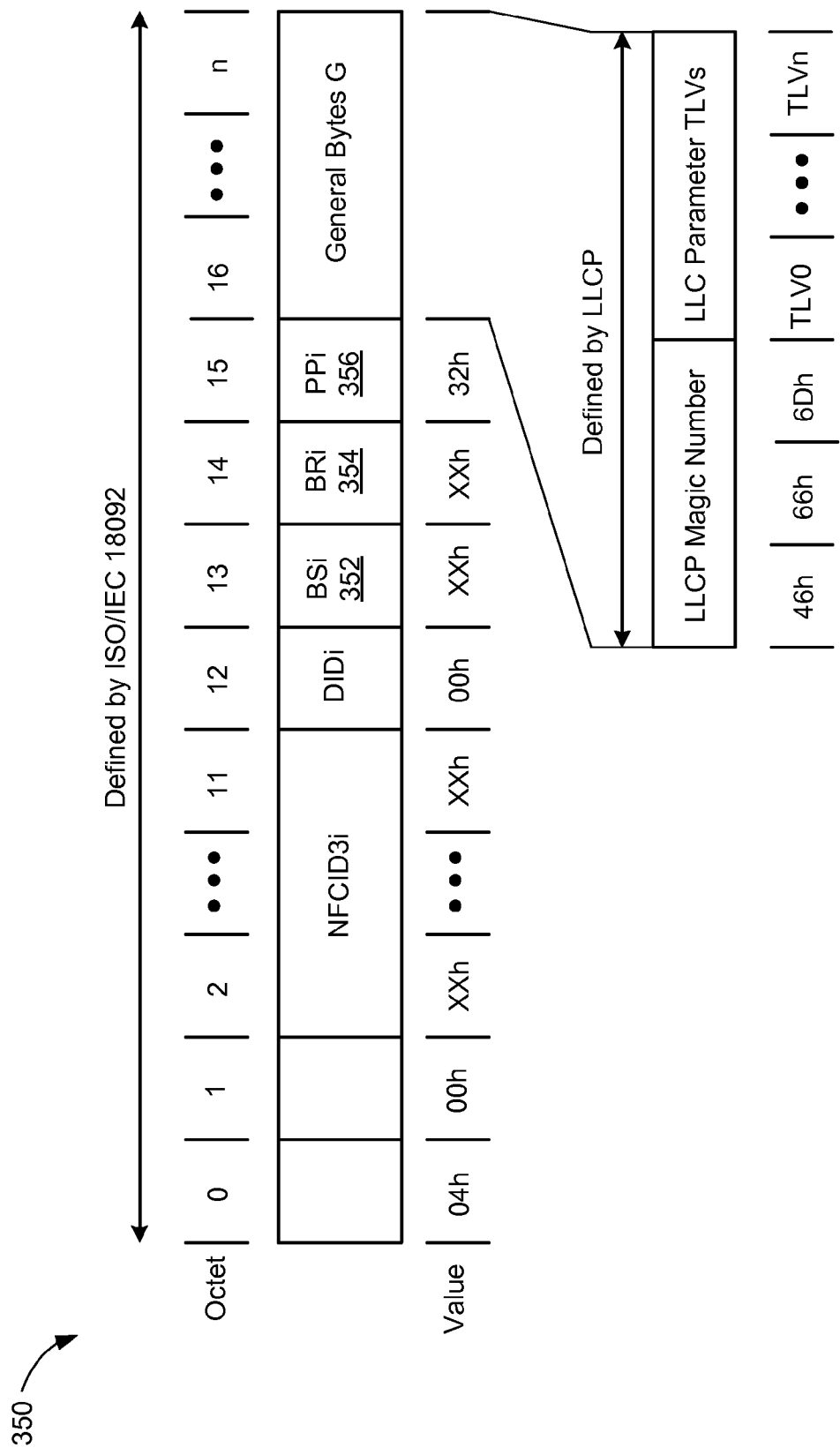
FIG. 3B depicts an exemplary NFC request frame within which the extended time period value may be embedded for at least some embodiments.

As mentioned above, initiator device D1 embeds the value for $T_{EXT}$ into the request frame sent to target device D2. The value for $T_{EXT}$ may be embedded into any suitable field or bit group within the request frame. For some embodiments, the value for $T_{EXT}$ may be encoded within one or more "reserved" bits of a selected field of the request frame. For example, FIG. 3B depicts an exemplary NFC request frame 350 within which the extended time period value $T_{EXT}$ may be embedded (e.g., by initiator device D1). Request frame 350, which is compliant with the ISO/IEC 18092 standards, includes a number of well-known fields including a bit rate send indicator (BSi) field 352, a bit rate receive indicator (BRi) field 354, and a presence of optional parameters indicator (PPi) field 356. The extended time period value $T_{EXT}$ may be encoded using one or more of the reserved bits for any of fields 352, 354, or 356. For one example, bits 0-3 of the BSi field 352 are reserved for future use, and therefore may be used to encode the extended time period value $T_{EXT}$. For another example, bits 0-3 of the BRi field 354 are reserved for future use, and therefore may be used to encode the extended time period value $T_{EXT}$. In this manner, using the four reserved bits (e.g., bits 0-3) of either the BSi field 352 or the BRi field 354 of request frame 350 allows initiator device D1 to encode up to $2^4=16$ possible values for $T_{EXT}$. For at least one embodiment, initiator device D1 uses two of the reserved bits to encode $2^2=4$ values for $T_{EXT}$ (e.g., 0 ms, 2 ms, 4 ms, and 8 ms).

FIGS. 4A and 4B are illustrative flow charts 400 and 450 depicting an exemplary operation for establishing an active mode NFC connection between initiator device D1 and target device D2 in accordance with some embodiments. First, referring to FIG. 4A, initiator device D1 generates and transmits an un-modulated NFC carrier signal CS1 (402). Next, initiator device D1 selects a value for the extended time period $T_{EXT}$ and embeds the value of $T_{EXT}$ into a request frame (404). Initiator device D1 modulates the request frame containing the embedded value of $T_{EXT}$ onto its NFC carrier signal CS1 (406), thereby transmitting the value of $T_{EXT}$ to target device D2. Then, initiator device D1 extends transmission of its carrier signal CS1 for the extended time period $T_{EXT}$ after modulating the request frame onto NFC carrier signal CS1 (408).

Referring now to FIG. 4B, target device D2 detects initiator device D1's carrier signal CS1 and receives the request frame transmitted from initiator device D1 (452). Target device D2 decodes the request frame and identifies initiator device D1's request for an active mode NFC connection (454). Then, target device D2 retrieves the value for the extended time period $T_{EXT}$ embedded in the request frame (456). In response thereto, target device D2 enables its NFC clock generator 230, by asserting its clock enable signal CLK_EN, according to the value of $T_{EXT}$ (458). Next, target device D2 generates its own NFC carrier signal CS2 using the clock signal CLK_D2 provided by its NFC clock generator 230 and transmits the NFC carrier signal CS2 to initiator device D1 (460). Then, target device D2 responds to initiator device D1 by modulating a response frame (e.g., ATR_RES) onto its NFC carrier signal CS2 (462).

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of operating an initiator device to establish an active mode near-field communication (NFC) connection with a target device, the method comprising:
   transmitting a first carrier signal from the initiator device;
   embedding into a request frame a value indicating an extended time period corresponding to an amount of time for the target device to stabilize a clock signal;
   modulating the request frame onto the first carrier signal;
   extending transmission of the first carrier signal for the extended time period after the modulating; and
   receiving a second carrier signal from the target device, after the extended time period, to establish the active mode NFC connection.

2. The method of claim 1, further comprising:
   terminating transmission of the first carrier signal only after the extended time period.

3. The method of claim 1, wherein the target device is to generate and transmit the second carrier signal no later than a predetermined response time after the initiator device terminates transmission of the first carrier signal.

4. The method of claim 1, wherein the value for the extended time period is embedded into one or more reserved bits of the request frame.

5. The method of claim 1, further comprising:
   storing the value for the extended time period in a look-up table provided in the initiator device.

6. The method of claim 1, wherein the first carrier signal is an un-modulated carrier signal during the extended time period.

7. A near-field communication (NFC) device, comprising:
   means for transmitting a first carrier signal to a target device;
   means for embedding, into a request frame, a request for an NFC active communication mode and a value indicating an extended time period corresponding to an amount of time for the target device to stabilize a clock signal;
   means for modulating the request frame onto the first carrier signal;
   means for extending transmission of the first carrier signal for the extended time period after the modulating; and
   means for receiving a second carrier signal from the target device, after the extended time period, to establish the active mode NFC connection.

8. The NFC device of claim 7, further comprising:
   means for terminating transmission of the first carrier signal only after the extended time period.

9. The NFC device of claim 7, wherein the value for the extended time period is embedded into one or more reserved bits of the request frame.

10. The NFC device of claim 7, further comprising:
    means for storing the value for the extended time period in a look-up table.

11. A non-transitory computer-readable medium containing program instructions that, when executed by a processor of a near-field communication (NFC) device, cause the NFC device to:
- transmit a first carrier signal from the NFC device to a target device;
- embed, into a request frame, a request for an NFC active communication mode and a value indicating an extended time period corresponding to an amount of time for the target device to stabilize a clock signal;
- modulate the request frame onto the first carrier signal;
- extend transmission of the first carrier signal for the extended time period after the modulating; and
- receive a second carrier signal from the target device, after the extended time period, to establish the active mode NFC connection.

12. The non-transitory computer-readable medium of claim 11, wherein execution of the program instructions further cause the NFC device to:
- terminate transmission of the first carrier signal only after the extended time period.

13. The non-transitory computer-readable medium of claim 11, wherein execution of the program instructions further cause the NFC device to:
- store the value for the extended time period in a look-up table.

14. The non-transitory computer-readable medium of claim 11, wherein the value for the extended time period is embedded into one or more reserved bits of the request frame.

15. A near-field communication (NFC) device, comprising:
- a transmitter to transmit a first carrier signal to a target device, wherein the first carrier signal includes a request frame to request an NFC active communication mode;
- a processor to:
  - embed into the request frame a value indicating an extended time period corresponding to an amount of time for the target device to stabilize a clock signal;
  - modulate the request frame onto the first carrier signal; and
  - extend transmission of the first carrier signal for the extended time period after the request frame is modulated onto the first carrier signal; and
- a receiver to receive a second carrier signal from the target device, after the extended time period, to establish the active mode NFC connection.

16. The NFC device of claim 15, further comprising:
- a look-up table to store the value for the extended time period.

17. The NFC device of claim 15, wherein the processor is to further:
- terminate transmission of the first carrier signal only after the extended time period.

18. The NFC device of claim 15, wherein the value for the extended time period is embedded into one or more reserved bits of the request frame.

* * * * *